(12) United States Patent
Gu et al.

(10) Patent No.: US 11,727,816 B2
(45) Date of Patent: Aug. 15, 2023

(54) SYSTEMS AND METHODS FOR AUTOMATIC FLIGHT PATTERN RECOGNITION

(71) Applicant: GE Aviation Systems LLC, Grand Rapids, MI (US)

(72) Inventors: Xiang Gu, Shanghai (CN); Xiaojie Wu, Shanghai (CN); Shangyun Lv, Shanghai (CN)

(73) Assignee: GE Aviation Systems LLC, Grand Rapids, MI (US)

( * ) Notice: Subject to any disclaimer, the term of this patent is extended or adjusted under 35 U.S.C. 154(b) by 344 days.

(21) Appl. No.: 17/012,421

(22) Filed: Sep. 4, 2020

(65) Prior Publication Data
US 2022/0076583 A1   Mar. 10, 2022

(51) Int. Cl.
| G08G 5/00 | (2006.01) |
| G06N 3/04 | (2023.01) |
| G06N 3/08 | (2023.01) |
| B64D 45/00 | (2006.01) |

(52) U.S. Cl.
CPC ........... *G08G 5/0047* (2013.01); *B64D 45/00* (2013.01); *G06N 3/04* (2013.01); *G06N 3/08* (2013.01); *G08G 5/0039* (2013.01); *B64D 2045/0075* (2013.01)

(58) Field of Classification Search
CPC .... G08G 5/0047; G08G 5/0039; B64D 45/00; B64D 2045/0075; G06N 3/04
See application file for complete search history.

(56) References Cited

U.S. PATENT DOCUMENTS

| 7,720,630 | B1 | 5/2010 | Miller et al. |
| 8,700,317 | B1 | 4/2014 | Wilder et al. |
| 9,640,079 | B1 | 5/2017 | Moravek et al. |
| 9,754,495 | B2 | 9/2017 | Whelan |
| 10,147,330 | B2 | 12/2018 | Schwartz et al. |
| 10,202,190 | B2 * | 2/2019 | Tao .................. G08G 5/006 |
| 10,360,804 | B2 | 7/2019 | De Prins et al. |
| 2003/0093219 | A1 | 5/2003 | Schultz et al. |
| 2018/0107227 | A1 | 4/2018 | Sharma |
| 2019/0147752 | A1 * | 5/2019 | Scarlatti ............ G08G 5/0039 701/120 |
| 2019/0162555 | A1 * | 5/2019 | Youssef ................. B64D 43/00 |
| 2020/0168104 | A1 * | 5/2020 | Holder .................. G06F 3/0482 |
| 2020/0327814 | A1 * | 10/2020 | Adolf .................. B64C 29/0025 |

* cited by examiner

*Primary Examiner* — Peter D Nolan
*Assistant Examiner* — Anwar Mohamed
(74) *Attorney, Agent, or Firm* — Dinsmore & Shohl LLP

(57) ABSTRACT

A method of providing an indication identifying a flight as including or not including a flight path deviation, the method includes receiving flight data associated with a flight, the flight data comprising a plurality of coordinates indicating a location of an aircraft at a plurality of times during the flight. The method also includes classifying a plurality of time intervals of the flight by applying a convolutional neural network algorithm to subsets of the plurality coordinates to determine that the time interval includes or does not include at least one flight path deviation. The method also includes identifying the flight as including at least one flight path deviation if at least one of the time intervals is classified as including the at least one flight path deviation and providing an indication identifying the flight as including at least one flight path deviation to a second computing system in response to identifying the flight as including at least one flight path deviation.

19 Claims, 8 Drawing Sheets

SYSTEMS AND METHODS FOR AUTOMATIC FLIGHT PATTERN RECOGNITION

BACKGROUND

Field

The present application generally relates to flight route pattern detection and, more particularly, to the utilization of convolutional neural networks to characterize flights by identifying flight path deviations.

Technical Background

Unplanned flight path modifications are costly for both the airlines managing flights as well as the customers of the airlines. For example, unexpected weather or traffic patterns associated with a particular route may cause an aircraft flying traveling that route to deviate from a planned flight path and incorporate a detour that may add miles to the flight, which may increase flight time. Not only is this inconvenient for the customers of the airline because of potential missed connections, but such a detour may cause the airline to use additional fuel and other resources.

Flight route pattern recognition techniques attempt to automatically recognize flights that deviate from planned routes. Existing flight route pattern recognition techniques suffer from various deficiencies. For example, existing techniques may utilize rule-based approach based on comparing the actual distance travelled by an aircraft over the course of a flight to a planned distance at various waypoints within the flight. Not only are these rule-based approaches computationally inefficient, but they are also inaccurate and fail to incorporate enough rules to accommodate the vast variety in variations of a flight path from a planned flight path that may take place. For example, such techniques may suffer from a false positive or false negative result of up to 55%. Such inaccurate results are not sufficient for accurate route planning and optimization.

SUMMARY

According to an embodiment of the present disclosure, a method of providing an indication identifying a flight as including or not including a flight path deviation includes receiving, by a computing system, flight data associated with a flight, the flight data comprising a plurality of coordinates indicating a location of an aircraft at a plurality of times during the flight. The method also includes classifying, by a flight analysis module of the computing system, a plurality of time intervals of the flight by applying a convolutional neural network algorithm to subsets of the plurality coordinates corresponding to each time interval of the plurality of time intervals to determine that the time interval includes or does not include at least one flight path deviation. The method also includes identifying, by the flight analysis module, the flight as including at least one flight path deviation if at least one of the time intervals is classified as including the at least one flight path deviation. The method also includes providing, by the computing system, an indication identifying the flight as including at least one flight path deviation to a second computing system in response to identifying the flight as including at least one flight path deviation. As an alternative, the method may provide an identifying the flight as including or not including at least one flight path deviation.

According to another embodiment, a method of providing an indication identifying a flight as including or not including a flight path deviation comprises receiving, by a computing system, flight data associated with a flight, the flight data comprising a plurality of coordinates indicating locations of an aircraft during the flight. The method also includes dividing, by a flight analysis module of the computing system, the flight data into a plurality of subsets, each of the subsets associated with a flight interval of the flight, wherein flight interval has a first end indicating a first location of the aircraft at a first time within the flight interval and a second end indicating a second location of the aircraft at a second time within the flight interval. The method also includes characterizing, by the flight analysis module, each of the flight intervals by successively applying a plurality of filters of a convolutional neural network algorithm to each of the plurality of subsets to determine that the flight interval includes or does not include at least one flight path deviation. The method also includes providing, by the computing system, an indication that the flight either includes or does not include the at least one flight path deviation based the characterization of each flight interval to a second computing system.

According to another embodiment, a system for providing an indication identifying a flight as including or not including a flight path deviation includes one or more processors and one or more non-transitory memory modules communicatively coupled to the one or more processors and storing machine-readable instructions. The machine-readable instructions cause the processor to receive flight data associated with a flight, the flight data comprising a plurality of coordinates indicating a location of an aircraft at a plurality of times during the flight; classify a plurality of time intervals of the flight by successively applying a plurality of filters of a convolutional neural network algorithm to subsets of the plurality coordinates corresponding to each time interval of the plurality of time intervals to determine that the time interval includes or does not include at least one flight path deviation; identify the flight as including at least one flight path deviation if at least one of the time intervals is classified as including the at least one flight path deviation; and provide an indication identifying the flight as including or not including at least one flight path deviation to a second computing system.

Additional features and advantages of the processes and systems described herein will be set forth in the detailed description which follows, and in part will be readily apparent to those skilled in the art from that description or recognized by practicing the embodiments described herein, comprising the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are comprised to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
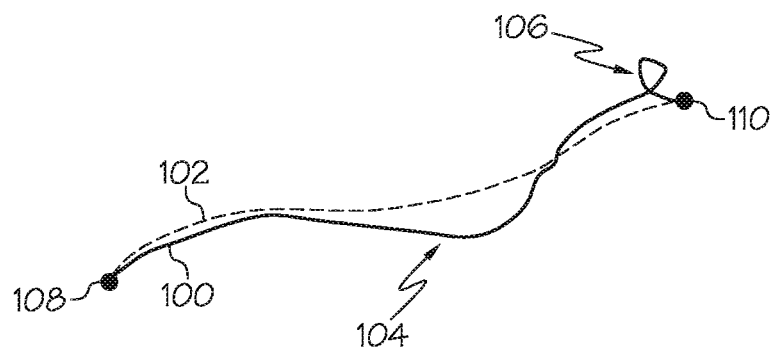
FIG. 1 graphically depicts an illustrative planned flight route and an illustrative actual flight route, according to one or more embodiments described herein.

Reference will now be made in detail to embodiments of systems and methods for characterizing flights based on classifying a plurality of time intervals of the flights as either including or not including at least one flight path deviation. The methods described herein include receiving flight data pertaining to a plurality of flights, the flight data containing a plurality of coordinates indicating locations of aircraft at a plurality of points in time during the plurality of flights. The methods described herein include classifying the time intervals of each of the plurality of flights by successively applying a convolutional neural network ("CNN") algorithm to subsets of the plurality of coordinates corresponding to the time intervals of each of the flights. The classification of each time interval may indicate that the time interval either does or does not include at least one flight path deviation. The methods may include providing an indication that each flight of the plurality of flights either does or does not include the at least one flight path deviation, and providing a route analysis identifying percentages of the flights associated with particular routes were classified as including the at least one flight path deviation.

The systems and methods described herein provide several benefits over existing rule-based flight route pattern recognition techniques. First, the systems and methods described herein generate more accurate flight classifications (e.g., classifying flights as either including or not including at least one flight path deviation) than existing rule-based methods utilized by existing flight route pattern recognition systems. Due to the vast numbers of different flight path deviations that may be present in a particular flight, it is difficult to build a static rule set that is comprehensive enough to identify each flight path deviation type within flight data because existing rule-based methods require a manually constructed rule-set or algorithm specifically configured to identify each specific flight path deviation type. If a particular flight path deviation type does not have an associated rule-set or algorithm in an existing flight route pattern recognition system, the system will fail to recognize that type of flight route deviation in analyzed flight data. As a result, existing rule-based methods are only able to analyze flight data for a fixed number of flight path deviations and thus provide an incomplete classification of flight data. Indeed, existing rule-based methods have a false classification rate (e.g., provide a false positive or a false negative result) of approximately 55% in some cases. The systems and methods described herein instead rely on a CNN algorithm adapted to classify flight data based on training data sets provided thereto. Such an approach is able to classify flight data as including or not including one of any number of different potential flight path deviations, depending on the classification provided via the training data sets. Such an approach provides more accurate (e.g., an accuracy of higher than 99% in certain implementations) and complete classification results than those provided by existing methods.

The systems and methods described herein also provide classification results at a relatively high computational efficiency and require fewer data inputs than existing methods. For example, the large rule sets in existing approaches necessary to analyze flight data for the large number of potential flight path deviations may cause a drain on computational resources and require a greater number of data inputs (e.g., latitude and longitude coordinates, pressure data, heading indicator data, and flight duration information). The present approach, by contrast, only needs longitude and latitude coordinates to more accurately classify flights than rule-based methods and are able to compute flight classifications in a computationally efficient manner (e.g., each flight may be classified in less than one second per flight in certain implementations). The present methods, therefore, provide more complete and accurate flight classifications using less data inputs than existing methods. It is estimated that an existing rule-based approach would require greater than 500 rules to achieve an accuracy similar to the systems and methods described herein and the existing rule-based approach is capable of processing 1000 flights in approximately 1 hour. The systems and methods described herein, in contrast, were able to process 1000 flights in approximately 10 minutes, representing significant time savings over the existing rule-based approach.

Additionally, the systems and methods described herein, by decomposing flight data associated with a particular flight into various time intervals, are able to estimate the amount of time spent by the aircraft over the course of a particular flight path deviation. For example, in embodiments described herein, the flight analysis system is capable of accurately estimating amounts of time that various flights spend in a holding pattern, thereby providing valuable information to flight operators for flight route operations. Existing approaches, in contrast, are not capable of providing such a time estimation. As such, the systems and methods described herein provide comprehensive and accurate flight path deviation characterization, enabling flight path deviations to be identified and detected in a computationally efficient manner and further expand computational capabilities in the field of route pattern detection and flight optimization.

As used herein, the term "flight path deviation" generally refers to a modification of a flight route from an expected or planned flight path for a particular flight. Flight path deviations may take any one of a plurality of different forms. For example, certain flight patterns, such as detours, where a flight path deviates from a planned flight path (e.g., due to an occurrence such as a weather condition or a traffic pattern) during the flight that may add miles to a flight path. Other deviations, such as shortcuts, may remove miles from a flight path. As will be appreciated, flight path deviations of a particular type (e.g., detour, shortcut, holding pattern, etc.) may differ from one another in several respects (e.g., form, duration, etc.). For instance, a first holding pattern of a first flight to a destination may differ from a second holding of a second holding pattern of a second flight to the same destination due to traffic pattern variations at an airport of the destination (e.g., the first holding pattern may be longer in duration than the second holding pattern and make take a different form).

As used herein, the term "module" may refer to, be part of, or include: an Application Specific Integrated Circuit (ASIC); a digital, analog, or mixed analog/digital discrete or integrated circuit; a combinational logic circuit; a field programmable gate array (FPGA); a processor circuit that executes machine-readable instructions; a memory circuit that stores machine-readable instructions executed by the processor circuit; other suitable hardware components that provide the described functionality; or a combination of some or all of the above.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, comprising: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" comprise plural referents unless the context clearly dictates otherwise. Thus, for example, reference to "a" component comprises aspects having two or more such components, unless the context clearly indicates otherwise.

Referring to FIG. 1, an actual flight path 100 and a planned flight path 102 are illustrated. For example, an airline may generate the planned flight path 102 between a departure point 108 and a destination 110 depending on a plurality of factors (e.g., expected air traffic, weather conditions, regulatory constraints, and/or the like). As shown, the actual flight path 100 includes flight path deviations 104 and 106 where the actual flight path 100 deviates from the planned flight path 102. The flight path deviations 104 and 106 both add to the flight (e.g., cause a length of the actual flight path 100 to increase over a planned flight path 102, cause an increase in flight time, or the like) in the shown example. The flight path deviation 104 is a detour in which the aircraft was required to navigate off the planned flight path 102 due to a potentially unexpected condition during the flight. For example, the flight path deviation 104 may result from an aircraft encountering unexpectedly turbulent air during the flight, or unexpected weather conditions (e.g., winds, precipitation, etc.) during the flight. The flight path deviation 106 is a holding pattern designed to delay the aircraft from reaching a particular location (e.g., the destination 110 in the shown example) while keeping the aircraft in a specified airspace responsive to, for example, traffic patterns at the specified location. While in the holding pattern, the aircraft may turn in a racetrack pattern starting at a predefined point in the planned flight path 102 (e.g., defined by a radio beacon). The racetrack pattern may include any number of turns. In one example, the flight path deviation 106 comprises two 180 degree turns separated by two relatively straight sections. Other holding patterns may include any number of turns and possess varying shapes, and thus vary in length (e.g., in both miles and time). The purpose of a holding pattern may be to delay the aircraft from arriving at a particular point on the planned flight path 102 (e.g., the destination 110) due to traffic congestion, poor weather, or runway availability (e.g., snowfall may render a runway temporarily unavailable.).

Flight path deviations such as the flight path deviations 104 and 106 cost an operator of the aircraft significant resources. By adding distance to the flight, the flight path deviations 104 and 106 cause the operator to use more fuel, which is costly. Additionally, the flight path deviations 104 and 106 may cause a delay in the flight such that the flight lands at the destination at a time significantly later than planned. Such a delay may have other cascading effects, causing additional flight delays and other costs. For example, a delayed flight may disrupt the availability of the runway at the destination 110 and cause other flights to enter into a holding pattern (e.g., similar to the flight path deviation 106). In another example, detours like the flight path deviation 104 may disrupt air traffic patterns of other flights, causing additional detours and delays. As such, a design of the planned flight path 102 to minimize instances of flight path deviations such as the flight path deviations 104 and 106 depicted potentially save the aircraft operator a significant quantity of costs and resources. To identify which modifications are needed to the planned flight path 102, an accurate analysis of accumulated flight data that identifies which routes repeatedly include flight path deviations and to further characterize the nature (e.g., duration) of the flight path deviations is described herein.

Figure 2:
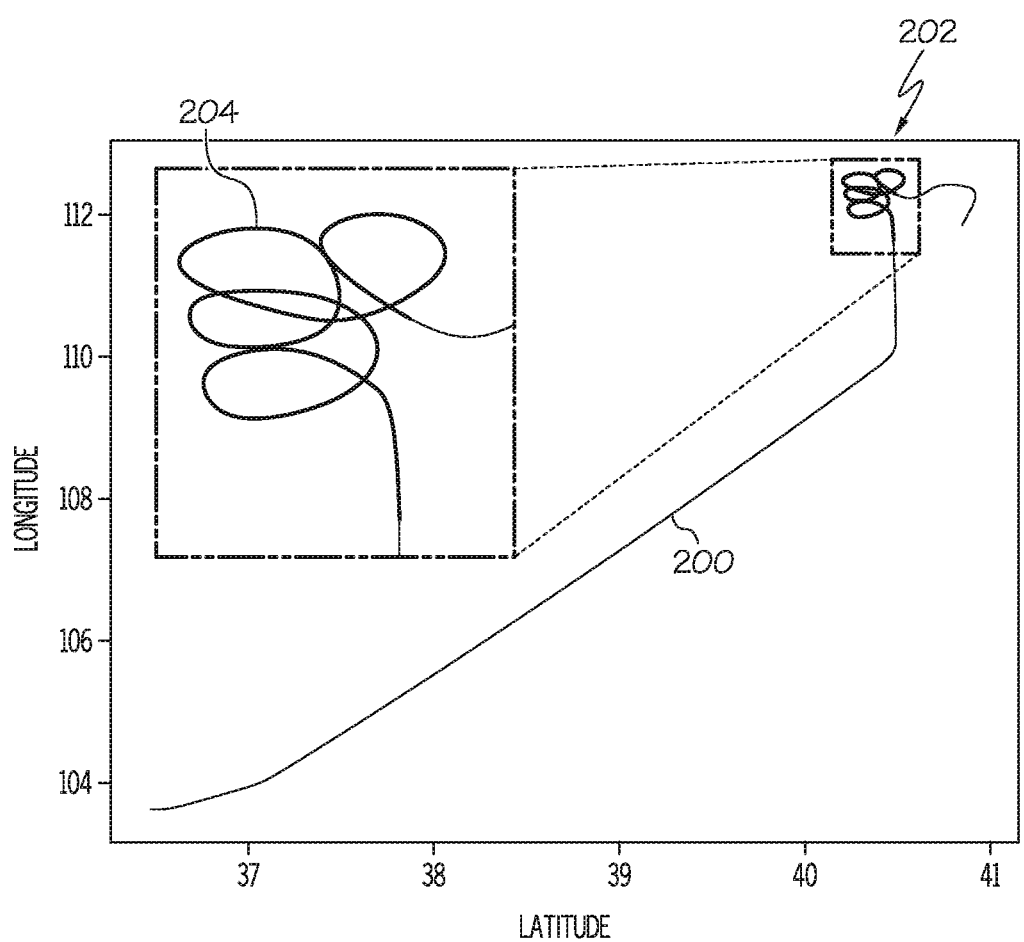
FIG. 2 depicts an illustrative actual flight route including an illustrative holding pattern, according to one or more embodiments described herein.

Certain flight path deviations may be particularly costly to aircraft operators. For example, referring to FIG. 2, an actual flight path 200 is depicted. The actual flight path 200 depicts the latitude coordinates and longitude coordinates of the aircraft at a plurality of instances in time during a flight. As shown, a portion 202 of the actual flight path 200 includes a holding pattern 204. The holding pattern 204 differs from the flight path deviation 106 shown in FIG. 1 in that the holding pattern 204 is more complex and comprises a plurality of additional turns as compared to the flight path deviation 106. Such additional turns may be necessitated by traffic or weather conditions encountered by the aircraft. For example, the aircraft may be initially placed in the holding pattern 204 due to the unavailability of a runway. After an initial holding pattern (e.g., similar to the flight path deviation 106 depicted in FIG. 1 and including a single racetrack pattern), the runway may still be unavailable (e.g., due to snow accumulation on the runway, due to traffic patterns) and the aircraft may be instructed to continue in the holding pattern indefinitely (e.g., perform additional turns) until the runway becomes available or the aircraft is reassigned to an alternative runway. The holding pattern 204 is generally of greater duration than the flight path deviation 106 and adds additional miles to a planned flight path. As such, it is particularly valuable for aircraft operators to identify and potentially design planned flight paths to avoid flight path deviations such as the holding pattern 204 depicted in FIG. 2.

Figure 3:
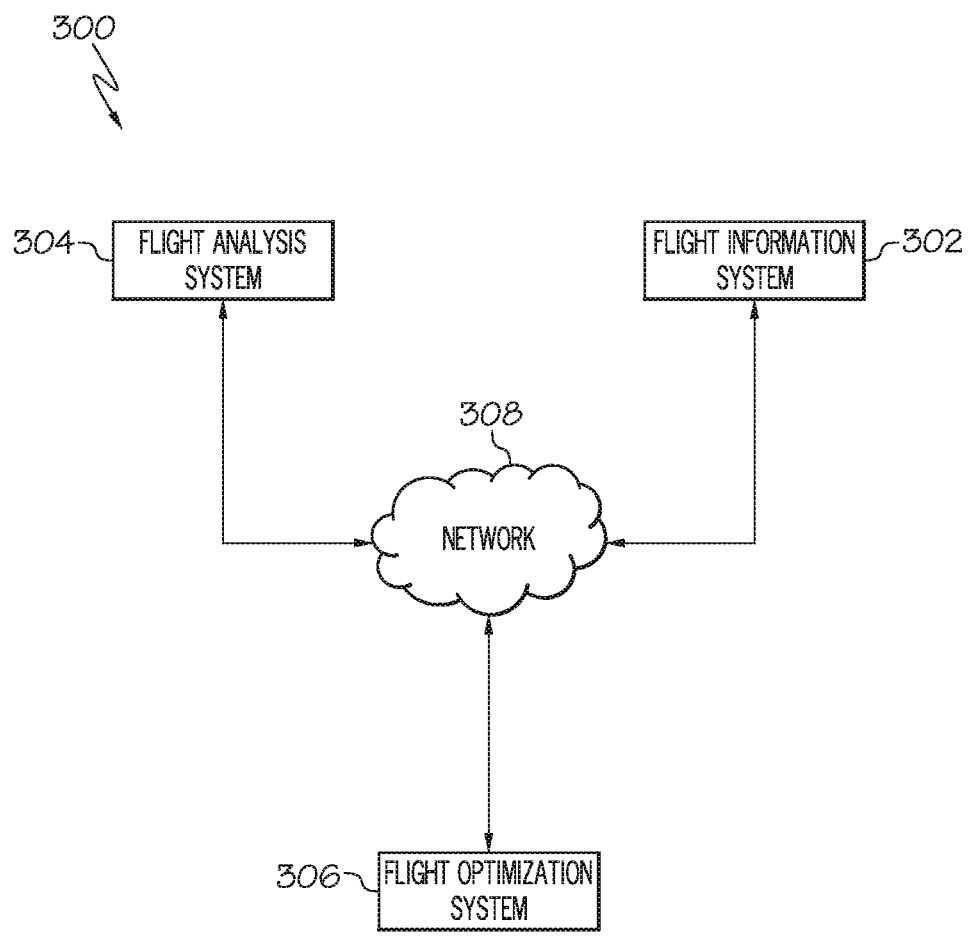
FIG. 3 schematically depicts an illustrative flight route pattern recognition, according to one or more embodiments described herein.

FIG. 3 schematically depicts an illustrative flight route pattern recognition system 300 in accordance with an example embodiment. The flight route pattern recognition system 300 includes a flight information system 302, a flight analysis system 304, and a flight optimization system 306. The flight information system 302, the flight analysis system 304, and the flight optimization system 306 are each communicably coupled to one another over a network 308. The network 308 may take a number of different forms depending on the implementation. For example, in embodiments, the network 308 may comprise a wireless network adapted for information transfer via any suitable protocol. Additionally, while the flight information system 302, the flight analysis system 304, and the flight optimization system 306 are each depicted as separate systems, it should be appreciated that the flight route pattern recognition system 300 may include any number of systems depending on the implementation, and that the components of any one of the systems may be included in any of the other systems of the flight route pattern recognition system 300.

The flight information system 302 is a computing system configured to receive and store flight data associated with a plurality of flights. For example, in embodiments, the flight information system 302 may accumulate flight data over the course of a predetermined period (e.g., a particular week, month, year, etc.). The accumulated flight data may describe the routes taken by aircraft over the course of the plurality of flights. In embodiments, the flight information system 302 may communicate with a system of an aircraft operator to periodically receive flight data associated with a plurality of flights conducted via the aircraft operator over a preceding period. The flight data may include a plurality of sets of coordinates, with each set corresponding to a particular flight. Each set of coordinates may describe a location of an aircraft (e.g., a longitude and a latitude) at a plurality of points in time over the course of a flight. The flight data may also include planned flight information, describing planned flight paths of the aircraft for the plurality of flights. In embodiments, the flight information system 302 may periodically transmit the stored flight data to the flight analysis system 304 and/or the flight optimization system 306. In embodiments, the flight information system 302 includes a flight database accessible to the flight analysis system 304 and/or the flight optimization system 306 via the network 308.

Figure 4:
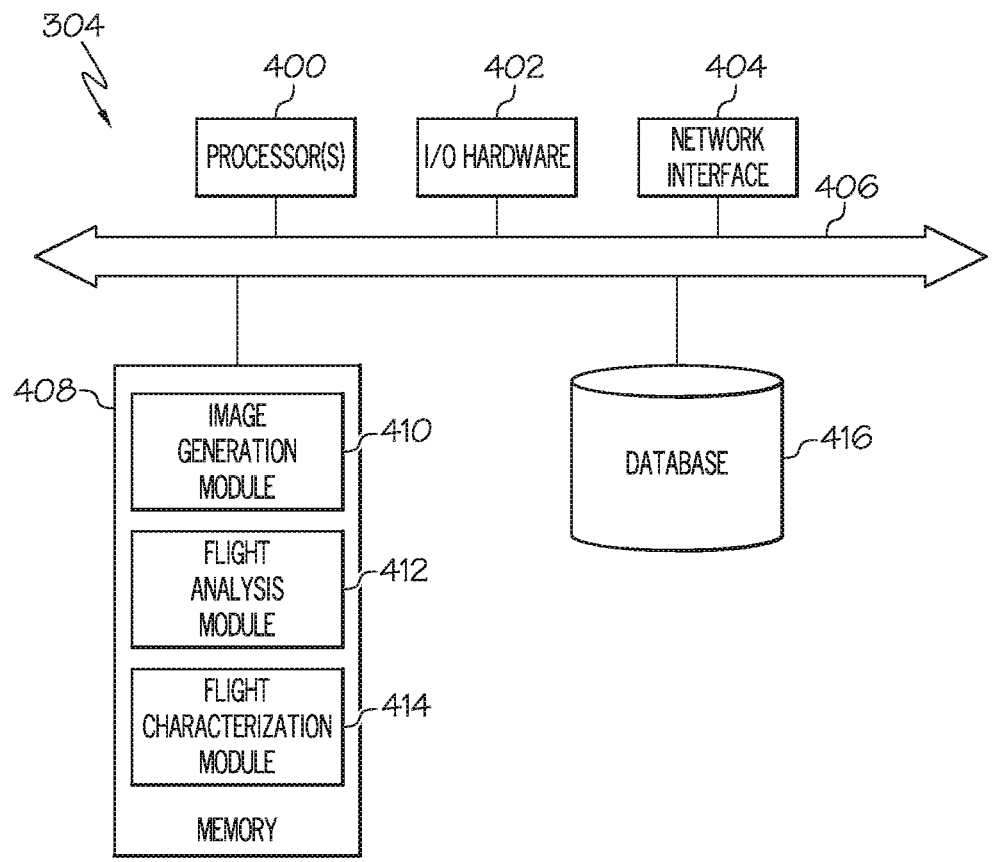
FIG. 4 schematically depicts an illustrative flight analysis system, according to one or more embodiments described herein.

The flight analysis system 304 is a computing system configured to classify the flights described in the flight data maintained via the flight information system 302 to determine that the flights either include or do not include at least one flight path deviation. Referring to FIG. 4, a more detailed view of the flight analysis system 304 is schematically depicted. As shown, the flight analysis system 304 includes a processor 400, input/output ("I/O") hardware 402, a network interface 404, a communications bus 406, a memory 408, and a database 416. While the flight analysis system 304 is shown to include a single processor 400, it should be appreciated that the flight analysis system 304 may include any number of processors depending on the implementation. The processor 400 can include any suitable processing device, such as a microprocessor, microcontroller, integrated circuit, logic device, and/or other suitable processing device. In embodiments, the processor 400 is a processing circuit (e.g., either a single processing circuit or a group processing circuit) that executes some or all of the machine-readable instructions from multiple modules of one or more non-transitory computer-readable mediums (e.g., the memory 408).

The I/O hardware 402 may include at least one element to receive inputs from a user and/or provide results of the computations performed via the flight analysis system 304 to a user. For example, in embodiments, the I/O hardware 402 may include a basic input/output system (BIOS) that interacts with hardware of the flight analysis system 304, device drivers that interact with particular devices of the flight analysis system 304, one or more operating systems, user applications, background services, background applications, and the like. The network interface 404 can include any suitable components for interfacing with one or more network(s), including for example, transmitters, receivers, ports, controllers, antennas, and/or other suitable components. The network interface 404 may include and/or be configured to communicate with any wired or wireless networking hardware, including an antenna, a modem, a LAN port, a wireless fidelity (Wi-Fi) card, a WiMax card, a long term evolution (LTE) card, a ZigBee card, a Bluetooth chip, a USB card, mobile communications hardware, and/or other hardware for communicating with other networks and/or devices. The network interface 404 allows the flight analysis system 304 to communicate with the other components of the flight route pattern recognition system 300 depicted in FIG. 3. The database 416 may generally include a data storage component communicably coupled to the processor 400 via the communication bus 406. As a non-limiting example, the database 416 may include one or more database servers that support NoSQL, MySQL, Oracle, SQL Server, NewSQL, and/or the like.

The memory 408 is communicatively coupled to the processor 400. As a non-limiting example, the memory 408 may include one or more non-transitory computer-readable mediums that may be one of a shared memory circuit, dedicated memory circuit, or group memory circuit. Non-limiting examples of the memory include random access memory (including SRAM, DRAM, and/or other types of random access memory), read-only memory (ROM), flash memory, registers, compact discs (CD), digital versatile discs (DVD), and/or other types of storage components. The memory 408 may store instructions accessible to the processor 400 via an addressing scheme such that the processor 400 may access the memory 408 to execute the instructions in accordance with a program to perform any of the functions and operations described herein.

The memory 408 is shown to include an image generation module 410, a flight analysis module 412, and a flight characterization module 414. It should be appreciated that these modules are exemplary only and that the memory 408 may include any number of modules to perform the various functions of the flight analysis system 304 described herein, and the functions performed by the image generation module 410, flight analysis module 412, and flight characterization module 414 may be performed by any other module consistent with the present disclosure.

The image generation module 410 is configured to generate plurality of digital flight path images from flight data received from the flight information system 302. In embodiments, each digital flight path image contains a plurality of coordinates associated with a particular flight. For example, the plurality of coordinates may indicate actual locations (e.g., in terms of longitude and latitude) of an aircraft at a plurality of points in time within the flight. The image generation module 410 may map the plurality of coordinates into a two-dimensional coordinate space such that a representation of an actual route of the aircraft is depicted within the two-dimensional coordinate space. In other words, the image generation module 410 generates a visual representation of a flight path based on coordinate sets contained in the flight data received from the flight information system 302. In embodiments, the image generation module 410 facilitates operation of the flight analysis module 412 by converting the problem of flight path deviation classification and identification into an image recognition problem suitable for processing and solution via machine learning algorithms.

The flight analysis module 412 is configured to classify a plurality of time intervals of flights by successively applying a plurality of filters of a convolutional neural network algorithm to each time interval to determine that the time interval includes or does not include at least one flight path deviation. In this regard, the flight analysis module 412 may subdivide the flight data received from the flight information system 302 (e.g., in the form of the digital flight image generated via the image generation module 410 in some embodiments or in numerical form in some embodiments) into a plurality of flight intervals. Each of the flight intervals may be associated with a particular flight and include (or represent) a subset of the plurality of coordinates included in the flight data associated with the flight. In embodiments, each flight interval may be associated with a particular fixed time interval (e.g., 10 seconds, 1 minute, or the like) within the flight. In embodiments, the flight intervals do not overlap with one another. In embodiments, the flight intervals may overlap with one another (e.g., a first flight interval may begin at the first second of the flight and end at the tenth second of the flight and a second flight interval may begin at a second of the flight and end at an eleventh second of the flight). Overlapping time intervals may beneficially facilitate estimating the duration of flight path deviations by providing higher time resolution.

The flight analysis module 412 is configured to classify each flight interval to determine whether that flight interval includes or does not include at least one flight path deviation. In this regard, the flight analysis module 412 may include a set of instructions that implement a CNN algorithm. The CNN algorithm may successively apply a plurality of filtering layers to a subset of the flight data associated with a particular flight interval and generate an identification for that flight interval. The identification may indicate whether the flight interval includes or does not include at least one flight path deviation (e.g., a detour, a holding pattern, a shortcut, or the like) and may identify a particular flight path deviation that the flight interval includes. In embodiments, the flight analysis module 412 may identify and characterize the flight path deviation based on a comparison between an actual flight route and a planned flight route within the flight interval. For example, in embodiments, the flight analysis module 412 may classify a flight interval as including a flight path deviation (e.g., via a filtering layer in the CNN algorithm) if an actual flight route deviates from planned flight route by more than a predetermined distance for more than a predetermined period. The predetermined period may be longer than the flight interval being classified in some embodiments such that, if the actual flight route is determined to deviate from the planned flight route by more than the predetermined distance for at least a predetermined number of successive flight intervals, the flight interval may be classified as including a flight path deviation. In embodiments, the flight analysis module 412 may classify a flight interval as including or not including a flight deviation by comparing an actual direction of the aircraft during the flight to a planned direction. In embodiments, the flight analysis module 412 may classify a flight interval as including or not including a flight deviation based on a comparison of the actual flight route with flight path deviation signatures (e.g., flight route shapes associated with particular flight path deviation types of historical flights) that are embedded into filtering layers of the CNN algorithm.

In embodiments, the flight analysis module 412 may also generate a flight identification for each flight described by the flight data based on the results of the classification for each flight interval. For example, in embodiments, the flight analysis module 412 may generate a flight identification that indicates whether or not a particular flight includes at least one flight path deviation if at least one of the flight intervals is classified by the CNN algorithm to include at least one flight path deviation. In embodiments, the flight identification may also indicate which particular flight path deviations are included in the flight (e.g., a holding pattern, a holding pattern and a detour, or the like). Additionally, the flight identification may also indicate characteristics of the particular flight path deviations (e.g., durations).

The CNN algorithm utilized by the flight analysis module 412 may include filtering layers that are generated by the flight analysis system 304 based on classified historical flight data. In embodiments, the classified historical flight data may include flight data such as that described above as being stored and maintained by the flight information system 302, and include an additional classification component. The classification component may contain identifiers at a level of detail desired to be output in the identifications generated by the flight analysis module 412. For example, in embodiments, the classification component may describe each flight represented in the classified historical flight data as including at least one of a plurality of flight path deviations (e.g., a holding pattern, a detour, a shortcut, etc.). In embodiments, the classification component may further identify a particular set of flight path deviations included in a flight path of a historical flight. For example, if a particular historical flight includes both a detour and a holding pattern, the classification component may identify that historical flight as such. In embodiments, the classification component may further include information describing each flight path deviation that the historical flights include. For example, if a particular historical flight is identified as including a holding pattern, the classification component may identify an interval of the holding pattern or a type of the holding pattern (e.g., number of turns).

The classified historical flight data generally includes a set of identifiers that are desired to be assigned to flight data by the flight analysis module 412. The classification component may be generated in a number of different ways. For example, in some embodiments, a user of the flight analysis system 304 may manually classify historical flight data in accordance with a flight path deviation classification scheme desired to be implemented via the flight analysis module 412. In embodiments, the flight information system 302 may include data necessary to assemble the classified historical flight data (e.g., identifying flight path deviations in flight data and their associated characteristics) and the flight analysis module 412 may assemble the classified historical flight data into a training set for the CNN algorithm. The CNN algorithm may successively apply a plurality of filtering layers to various subsets of the training set in a plurality of iterations to generate coefficient sets to apply to outputs of the filtering layers such that the CNN algorithm outputs a classification vector representing accurate probabilities that the flight interval includes at least one flight path deviation. An example structure of the CNN algorithm used to classify each flight interval is described in more detail with respect to FIG. 7.

Still referring to FIG. 4, the flight characterization module 414 is configured to generate an output representative of the results of the classification of the flight data performed via the flight analysis module 412. In various embodiments, the flight characterization module 414 is configured to periodically generate a report containing results of the classification performed by the flight analysis module 412 (e.g., classifying flights occurring during the preceding period). In embodiments, the flight characterization module 414 is configured to generate a report summarizing the results of the classification. In embodiments, the output generated by the flight characterization module 414 contains each of the digital flight path images generated via the image generation module 410. Each of the digital flight path images may be associated with a particular flight based on route and a particular time of the flight. The output may be in any format depending on the implementation. For example, in embodiments, the output may be stored in the database 416 for access by a user of the flight analysis system 304. In embodiments, the output may be formatted as a webpage or the like for viewing by the user (e.g., via the I/O hardware 402 or via any system connected to the network 308). In embodiments, the user may select a particular flight to view the digital flight path image associated with that flight (e.g., including a planned flight path and an actual flight path) and view the results of the classification.

In embodiments, the flight characterization module 414 identifies patterns in the results of the classification performed by the flight analysis module 412. For example, the flight characterization module 414 may group flights represented by the flight data received from the flight information system 302 based on common characteristics, such as common departure point and/or destination point, time/date of flight, type of aircraft, and weather pattern. The output generated by the flight characterization module 414 may also include statistics of the results of the classification of the flight data performed via the flight analysis module 412. For example, for a subset of flights having a common departure point and destination, the flight characterization module 414 may identify a portion (e.g., as a percentage) of the subset of flights identified to include at least one flight path deviation. The statistics may further identify characteristics of the flight path deviations associated with the subset of flights (e.g., a breakdown of the type of flight path deviation, duration statistics of the flight path deviation, or the like).

Figure 5:
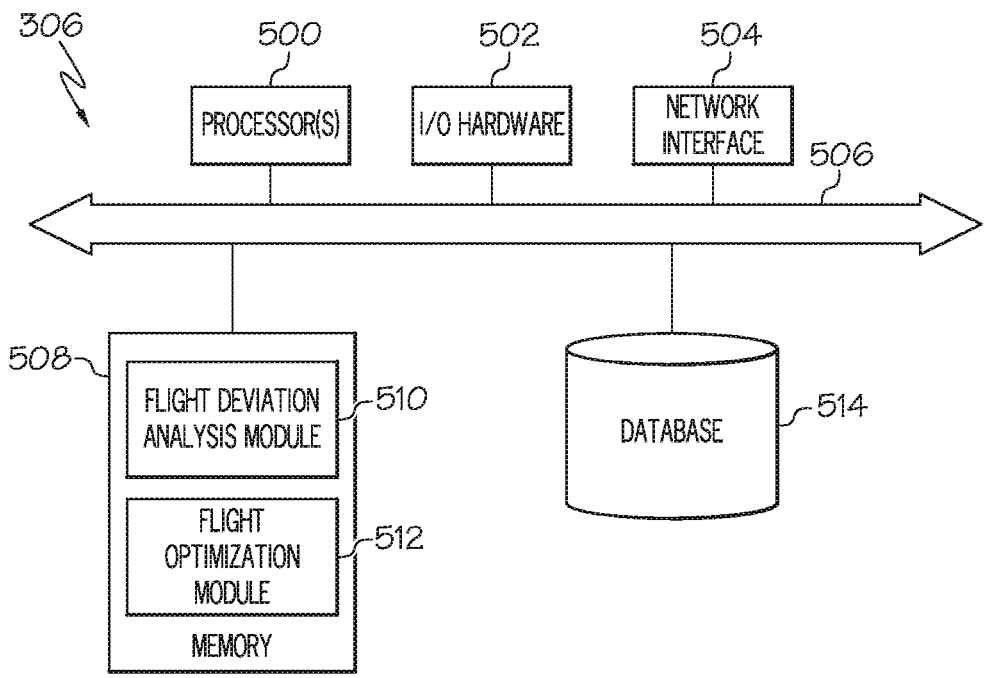
FIG. 5 schematically depicts an illustrative flight optimization system, according to one or more embodiments described herein.

Referring again to FIG. 3, the flight optimization system 306 is configured to receive outputs (e.g., indications identifying the results of the classification of the flight data) and generate recommended adjustments in planned flight paths based on the flight classifications performed via the flight analysis system 304. Referring now to FIG. 5, a more detailed view of the flight optimization system 306 is schematically depicted. As shown, the flight optimization system 306 includes a processor 500, input/output ("I/O") hardware 502, a network interface 504, a communications bus 506, a memory 508, and a database 514. While the flight analysis system 304 is shown to include a single processor 500, it should be appreciated that the flight optimization system 306 may include any number of processors depending on the implementation. The processor 500 can include any suitable processing device, such as a microprocessor, microcontroller, integrated circuit, logic device, and/or other suitable processing device. In embodiments, the processor 500 is a processing circuit (e.g., either a single processing circuit or a group processing circuit) that executes some or all of the machine-readable instructions from multiple modules of one or more non-transitory computer-readable mediums.

The I/O hardware 502 may include at least one element to receive inputs from a user and/or provide results of the computations performed via the flight optimization system 306 to a user. For example, in embodiments, the I/O hardware 502 may include a basic input/output system (BIOS) that interacts with hardware of the flight optimization system 306, device drivers that interact with particular devices of the flight optimization system 306, one or more operating systems, user applications, background services, background applications, and the like. The network interface 504 can include any suitable components for interfacing with one or more network(s), including for example, transmitters, receivers, ports, controllers, antennas, and/or other suitable components. The network interface 504 may include and/or be configured to communicate with any wired or wireless networking hardware, including an antenna, a modem, a LAN port, a wireless fidelity (Wi-Fi) card, a WiMax® card, a long term evolution (LTE®) card, a ZigBee® card, a Bluetooth® chip, a USB™ card, mobile communications hardware, and/or other hardware for communicating with other networks and/or devices. The network interface 504 allows the flight optimization system 306 to communicate with the other components of the flight route pattern recognition system 300 depicted in FIG. 3. The database 514 may generally comprise a data storage component communicably coupled to the processor 500 via the communication bus 506. As a non-limiting example, the database 514 may include one or more database servers that support NoSQL, MySQL®, Oracle®, SQL Server®, NewSQL, and/or the like.

The memory 508 are communicatively coupled to the processor 500. As a non-limiting example, the memory 508 may include one or more non-transitory computer-readable mediums that may be one of a shared memory circuit, dedicated memory circuit, or group memory circuit. Non-limiting examples of the memory 508 may include one or more non-transitory computer-readable mediums that include random access memory (including SRAM, DRAM, and/or other types of random access memory), read-only memory (ROM), flash memory, registers, compact discs (CD), digital versatile discs (DVD), and/or other types of storage components. Memory 508 may store instructions accessible to the processor 500 via an addressing scheme such that the processor 500 may access the memory 508 to execute the instructions in accordance with a program to perform any of the functions and operations described herein.

The memory 508 is shown to include a flight deviation analysis module 510 and a flight optimization module 512. It should be appreciated that these modules are exemplary only and that the memory 508 may include any number of modules to perform the various functions of the flight optimization system 306 described herein, and the functions performed by the flight deviation analysis module 510 and the flight optimization module 512 may be performed by any other module consistent with the present disclosure.

The flight deviation analysis module 510 is configured to assess the results of the classification of the flight data performed via the flight analysis system 304. For example, in embodiments, the flight deviation analysis module 510 may identify trends in the results of the flight data classification. For example, the flight deviation analysis module 510 may identify particular routes associated with relatively high flight path deviation percentages (e.g., compare percentages of flights identified as containing a flight path deviation to various thresholds). The flight deviation analysis module 510 may also correlate flights identified as including flight path deviations with additional data characteristics (e.g., time of day, weather conditions, aircraft, or the like).

The flight optimization module 512 is configured to generate recommended route changes based on the assessment results of the flight deviation analysis module 510. For example, if a particular planned route is associated with numerous flights identified to include a flight path deviation such as a detour, the flight optimization module 512 may identify an alternative route between the same departure point and destination. The flight optimization module 512 may generate a recommendation based on the correlations generated via flight deviation analysis module 510. For example, if flight path deviations in a particular route tend to occur at a particular time, the flight optimization module 512 may suggest a modification of a flight schedule to avoid those times and thereby reduce the chances of flight path deviations. In embodiments, the flight optimization module 512 may generate a predictive model for flight routes to determine a likelihood of a particular flight path deviation for a future planned flight. A user may input a planned flight schedule of a plurality of future flights to the flight optimization module 512 and the flight optimization module 512 may identify a plurality of likelihoods that each future flight may include a flight path deviation. In embodiments, if a likelihood associated with a particular future flight is above a certain threshold, the flight optimization module 512 may flag the future flight and identify that flight in an output viewable by the user that may also include a suggested planned route change.

Figure 6:
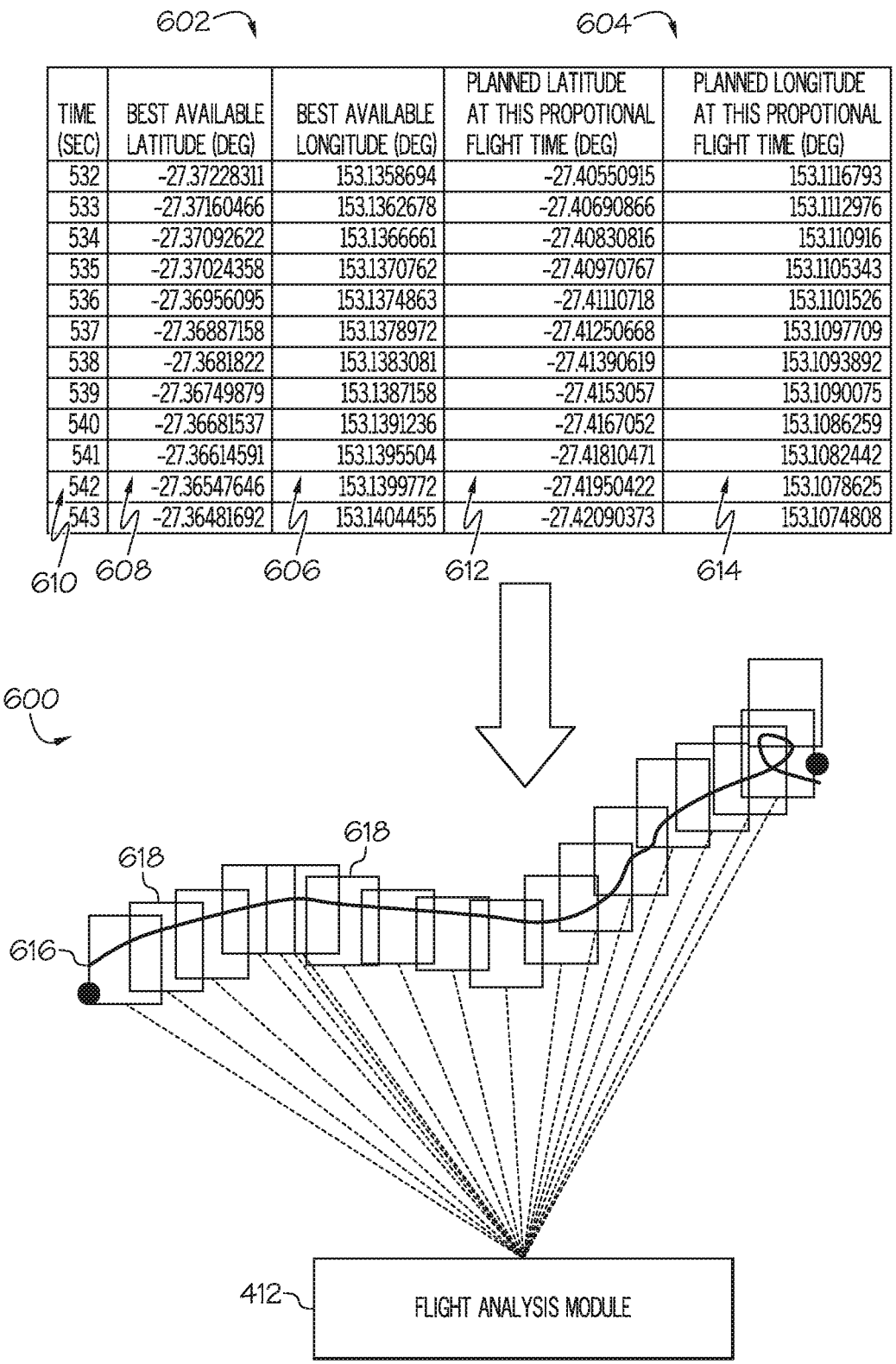
FIG. 6 schematically depicts an illustrative process flow for a flight analysis module of a flight analysis system, according to one or more embodiments described herein.

In FIG. 6, a data process flow 600 for the flight analysis system 304 is illustrated, according to an example embodiment. Referring to FIGS. 3 and 6, flight data that is received from the flight information system 302, for example, may include a first plurality of coordinates 602 (e.g., the set of latitude and longitude coordinates on the left) and a second plurality of coordinates 604 (e.g., the set of latitude and longitude coordinates on the right). Each set of coordinates in the first plurality of coordinates 602 is associated with a particular point in time, or time coordinate 610, of a flight and includes a first coordinate 606 indicating a longitude of an aircraft in the flight and a second coordinate 608 indicating a latitude of the aircraft in the flight. Each set of coordinates in the second plurality of coordinates 608 is associated with a particular point in time of a flight and includes a first coordinate 612 indicating a planned latitude of the aircraft in the flight and a second coordinate 614 indicating a planned longitude of the aircraft in the flight. In embodiments, the flight data received from the flight information system 302 includes flight data for a plurality of flights over a predetermined period.

In embodiments, the first and second pluralities of coordinates 602 and 604 are processed by the image generation module 410 of the flight analysis system 304 depicted in FIG. 3 (the image generation module 410 is not depicted in FIG. 6). As described herein, via the image generation module 410, a digital flight path image 616 is generated based on flight data associated with a particular flight. In the example shown, the digital flight path image 616 depicts the first plurality of coordinates in a two-dimensional space. While only the actual flight path of the aircraft is shown in the digital flight path image 616, it should be appreciated that the digital flight path image 616 may also depict the second plurality of coordinates 604 as a planned flight route for the flight. In embodiments, the image generation module 410 may utilize curve fitting or data interpolation techniques to depict the flight path as a line rather than as a set of coordinates.

In embodiments, the time coordinates 610 of the flight data are not incorporated into the digital flight path image 616. As such, to divide the flight into a plurality of flight intervals associated with a subset of the coordinates associated with the flight, the image generation module 410 of the flight analysis system 304 shown in FIG. 3 generates a plurality of sub-flight images contained in a sliding time window 618. Each sub-flight image is an image of a portion of the flight described in the flight data received from the flight information system 302 described with respect to FIG. 3. In embodiments, the portion of the flight may have a length in time corresponding to the sliding time window 618 (e.g., each sub-flight image may depict a 1 minute portion of an actual flight route). The sliding time window 618 may have a fixed width set by a user of the flight analysis system 304. In embodiments, the image generation module 410 moves the sliding time window 618 over an entirety of the digital flight path image 616 to generate a plurality of sub-flight images of various segments of the flight path. Each of the segments of the flight path is associated with a subset of the plurality of coordinates used to generate the image of that portion of the digital flight path image. As shown, the sliding time window 618 may be applied to the digital flight path image 616 such that each sub-flight image is of a segment of the flight path that overlaps with adjacent segments of the flight path. Such overlap may beneficially increase the time resolution of the classification performed via the flight analysis module 412 of the flight analysis system 304 depicted in FIG. 3 herein. By overlapping the sub-flight images, the flight analysis module may characterize any flight path deviations contained in the flight data more accurately. To illustrate, a first one of the sub-flight images may depict a first minute of the flight (e.g., between a $1^{st}$ second of the flight and a $60^{th}$ second of the flight) and, to generate a second one of the sub-flight images, the sliding time window 618 may be moved by 10 seconds (e.g., such that the second one of the sub-flight images contains a segment between a $10^{th}$ second of the flight to a $70^{th}$ second of the flight). In embodiments, a width of the sliding time window 618 or the amount that the sliding time window 618 slides to generate adjacent sub-flight images may not be constant and change for various portions of the digital flight path image 616. In embodiments, the sliding time window 618 moves at a constant rate relative to digital flight path image 616. For example, after application to a first portion of the digital flight image 616, the sliding time window 618 may be moved by a fixed amount (e.g., 10 seconds) and then be applied to a second portion of the digital flight image 616. The fixed amount may be adjusted to produce either higher precision identifications (e.g., when the fixed amount is decreased) or reduce the processing time of the image generation module 410 (e.g., when the fixed amount is increased).

As shown, after the digital flight path image 616 is divided into a plurality of sub-flight images, each of the sub-flight images representing a segment of the flight path associated with a time interval (e.g., the width of the sliding time window 618) of the flight is classified via the flight analysis module 412 to determine whether the flight interval depicted in a particular one of the sub-flight images includes or does not include at least one flight path deviation. In certain implementations, rather than generating the digital flight path image, flight data received from the flight information system 302 may be directly divided into a plurality of flight intervals by taking subsets of the pluralities of coordinates 602 and 604 based on the time coordinates 610 associated with each set of coordinates (e.g., flight data associated with a particular flight may be divided into a plurality of subsets representing a plurality of time intervals of the flight having boundaries based on values of the time coordinates 610).

Figure 7:
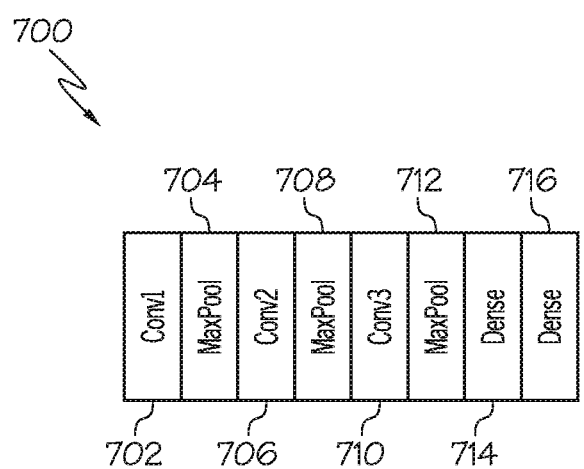
FIG. 7 schematically depicts an illustrative filtering and densification layers of convolutional neural network algorithm, according to one or more embodiments described herein.

Referring now to FIG. 7, an example layer structure 700 for CNN algorithm used to classify each flight interval described in the flight data received from the flight information system 302 is schematically depicted. As shown, the layer structure 700 comprises a first convolution layer 702, a first pooling layer 704, a second convolution layer 706, a second pooling layer 708, a third convolution layer 710, a third pooling layer 712, a first densification layer 714, and a second densification layer 716. In embodiments, the first convolution layer 702 and the first pooling layer 704 is a first filtering layer, the second convolution layer 706 and the second pooling layer 708 is a second filtering layer, and the third convolution layer 710 and third pooling layer 712 is a third filtering layer. The first convolution layer 702 may comprise a first array of coefficients that are applied to various portions of the sub-flight images generated via the image generation module 410. For example, in embodiments, the first convolution layer 702 comprises a 3×3 kernel such that the flight analysis module 412 successively multiples 3×3 subsets of the sub-flight images by the first convolution layer 702 until an entirety of the sub-flight image is covered. It should be appreciated that convolution layers having different kernel sizes may be used in alternative embodiments. Moreover, it should be appreciated that the layer structure 700 is exemplary only and alternative layer structures may be used. For example, in embodiments, an alternative layer structure similar to the layer structure 700 may be used, but the alternative layer structure may include an additional pooling layer. Any number and configuration of layers may be used consistent with the present disclosure. Moreover, in embodiments, the flight analysis module 412 may use an alternative CNN algorithm such as an object detection algorithm (e.g., a You Only Look Once (YOLO) algorithm) to classify the flight intervals.

The array of coefficients of the first convolution layer 702 may be designed to incorporate high level features of flight path deviations desired to be identified via the layer structure 700. The first pooling layer 704 may reduce subsets of an output of the first convolution layer 702 to a single value. In embodiments, the first pooling layer 704 utilizes max pooling and takes maximum values of subsets (e.g., 2×2 arrays) of the output of the first convolution layer 702 to generate a first activation map. Beneficially, max pooling may remove noise from the output of the first convolution layer 702, though other forms of pooling may be used. The first activation map is then provided to the second convolution layer 706 and second pooling layer 708, which may operate in a manner similar to the first convolution layer 702 and the first pooling layer 704 to generate a second activation map. The second activation map may then be provided to the third convolution layer 710 and third pooling layer 712 to generate a third activation map. In embodiments, the values making up each of the first convolution layer 702, the second convolution layer 706, and the third convolution layer 710 are trained and optimized via a gradient descent method that updates these values via gradient based on a comparison of the results of the classification by the CNN algorithm to the actual classification result of a training set. In embodiments, the number of values in each of the first convolution layer 702, the second convolution layer 706, and the third convolution layer 710 (e.g., the matrix size associated with each convolution layer) may be tuned via a hyperparameter tuning method and cross validation. In an example, the flight classification module 412 utilizes a CNN algorithm having four convolution layers. The digital flight path image 616 may have 3 channels (e.g., red, green and blue). In such a case, the number of values in each convolution layer may double with each convolution layer (e.g., containing 16, 32, 64, and 128 values, respectively), though the number of values in each convolution layer may be tuned to improve performance.

In embodiments, the first densification layer 714 flattens the third activation map output from the third pooling layer 712 into a vector of values. In embodiments, the second densification layer 716 contains a vector of coefficients used to non-linearly combine the vector of values in the first densification layer 714 to generate a probability vector (not depicted). As described herein, the vector of coefficients may be determined through iteratively applying the CNN algorithm to a historical flight data and comparing the results to a classification component until an adequately accurate results is obtained. In embodiments, each value in the probability vector represents a probability that the flight interval input to the layer structure 700 (e.g., the flight segment depicted in a sub-flight image) contains a particular flight path deviation or a portion of a flight path deviation. For example, in embodiments, the probability vector may include a first value indicating a probability that a flight interval includes a holding pattern and a second value indicating a probability that the flight interval includes a detour. In embodiments, if values in the probability vector are above a first threshold (e.g., 90%), the flight analysis module 412 classifies the flight interval as including a flight path deviation. If values in the probability vector are below a second threshold (e.g., 10%), the flight analysis module 412 classifies the flight interval as not including a flight path deviation. If values in the probability vector are between the first and second thresholds, the flight analysis module 412 may not classify a particular flight interval. The thresholds used to classify the flight interval may be adjusted in various embodiments and may depend on the associated flight path deviation (e.g., the thresholds for a holding pattern may be different than the thresholds for a detour).

Figure 8:
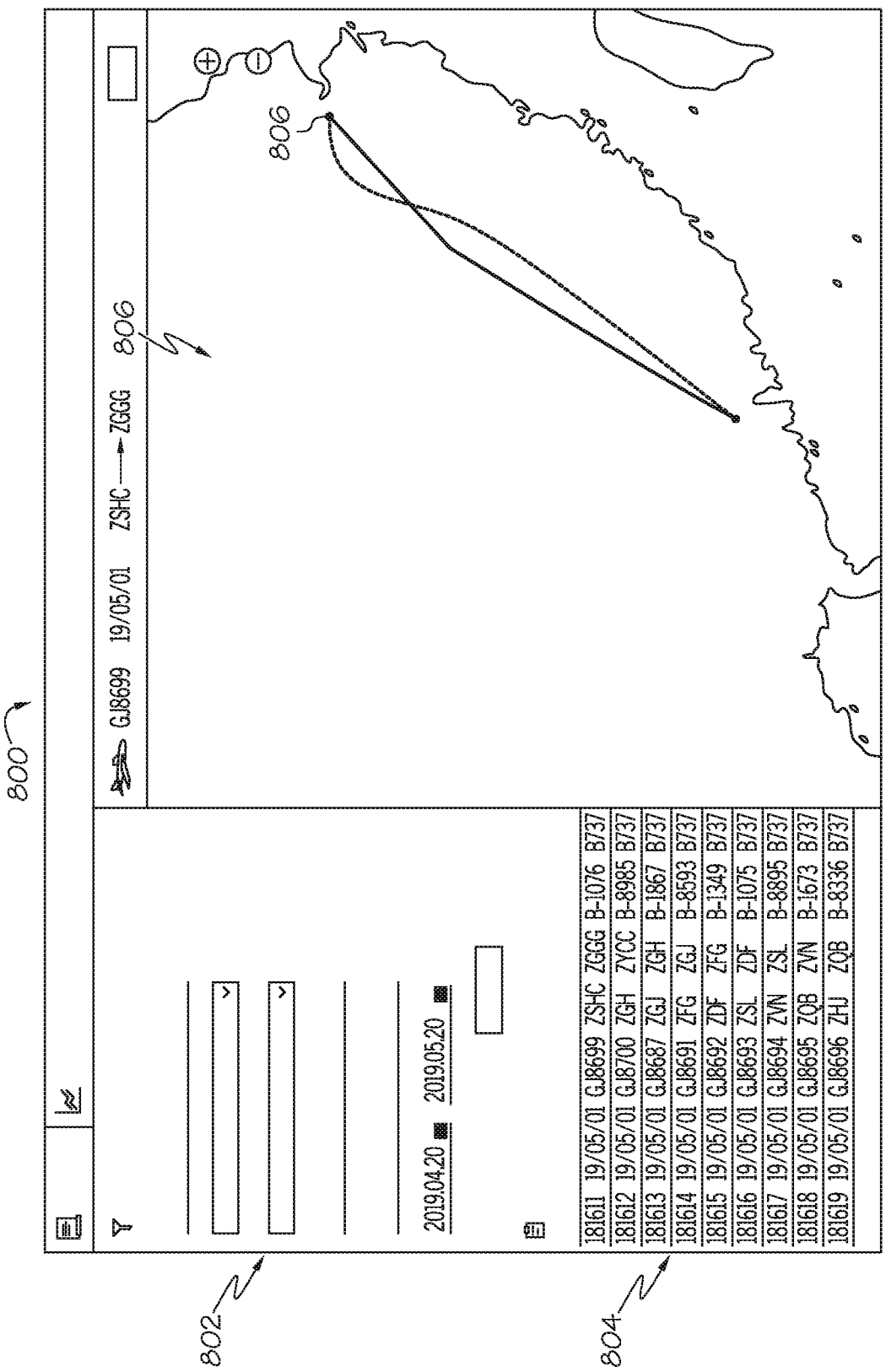
FIG. 8 depicts an illustrative user interface displaying information with respect to planned and actual flight routes for a plurality of flights, according to one or more embodiments described herein.

Referring now to FIG. 8, a user interface 800 comprising information with respect to planned and actual flight routes for a plurality of flights is depicted according to an example embodiment. In embodiments, the user interface 800 depicts an output generated via the flight characterization module 414 described herein with respect to FIG. 4. As shown, the user interface 800 includes a flight selection portion 802, a flight information portion 804, and a digital flight image portion 806. The flight selection portion 802 is configured to receive an input identifying flight characteristics (e.g., destination, departure point, a date range, etc.). In response to the input received via the flight selection portion 802, the flight analysis system 304 may retrieve flight data (e.g., from the database 416 and/or from the flight information system 302) and depict the flight data in the flight information portion 804. In embodiments, the retrieved flight data is arranged in the flight information portion 804 by flight. The user may select a particular flight in the flight information portion 804 and the digital flight image portion 806 may display the digital flight image generated via the image generation module 410 in response to a user selection of a particular flight.

Figure 9:
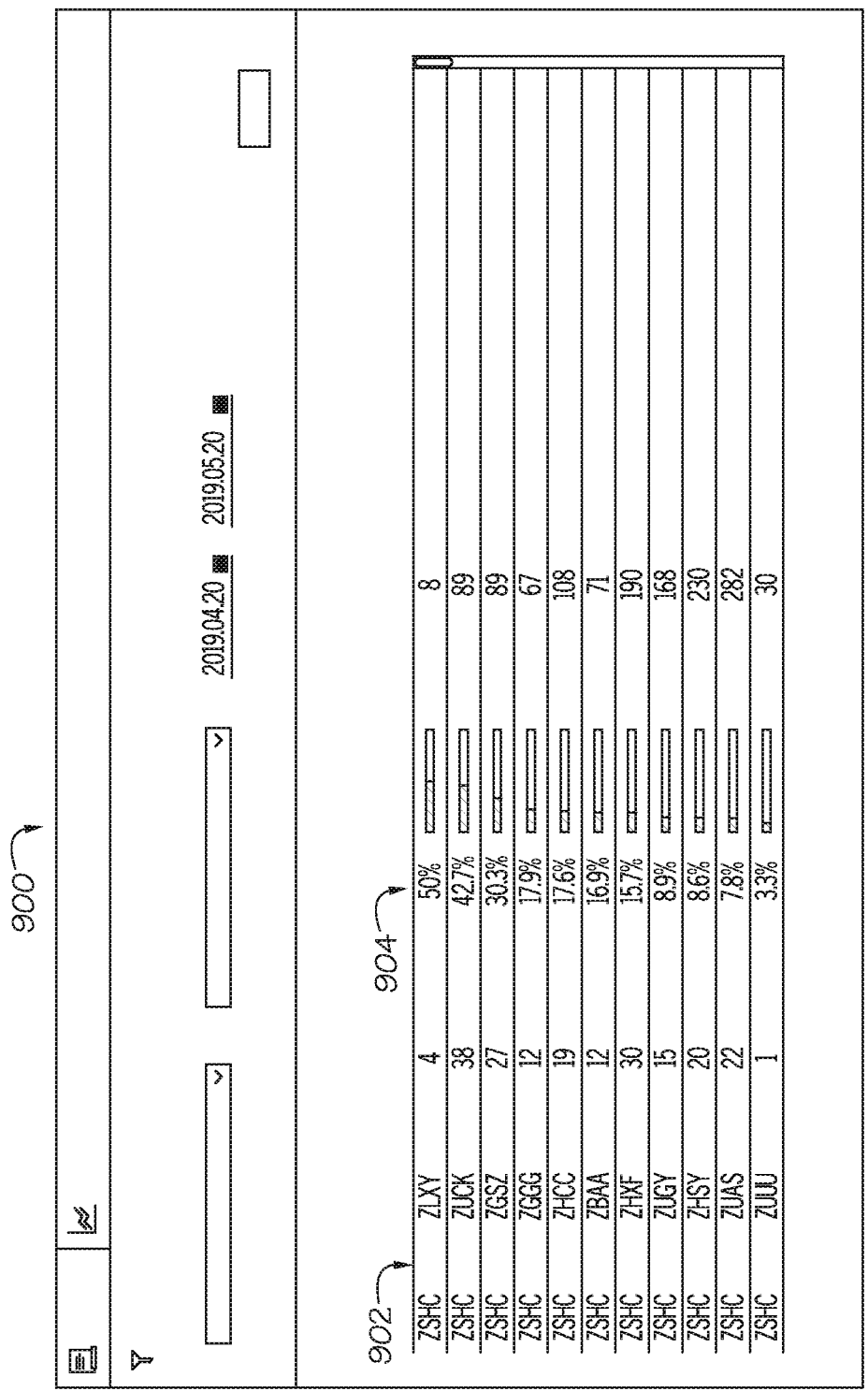
FIG. 9 depicts an illustrative user interface displaying flight path deviation percentages for a plurality of flights, according to one or more embodiments described herein.

Referring now to FIG. 9, a user interface 900 comprising results of the classification of flights via the flight analysis module 412 described herein is depicted according to an example embodiment. In embodiments, the user interface 900 depicts an output generated via the flight characterization module 414 described herein with respect to FIG. 4. As shown, the user interface 900 includes the classification results for flights lying within a specified timeframe. A plurality of flights are grouped together in accordance with the routes 902 of the flights. In other words, in the shown example, classifications of flights are analysed and grouped together when the flights share a common departure point and destination. Each grouping of flights includes a percentage 904 indicating the percentage of flights in that particular group that were classified via the flight analysis module to include at least one flight path deviation. As described herein, the flight characterization module 414 of the flight analysis system 304 shown in FIG. 3 may periodically generate such reports based on flight data received from the flight information system 302 to provide aircraft operators with up to date statistics on flight routes associated with relatively high rates of flight path deviations.

Figure 10:
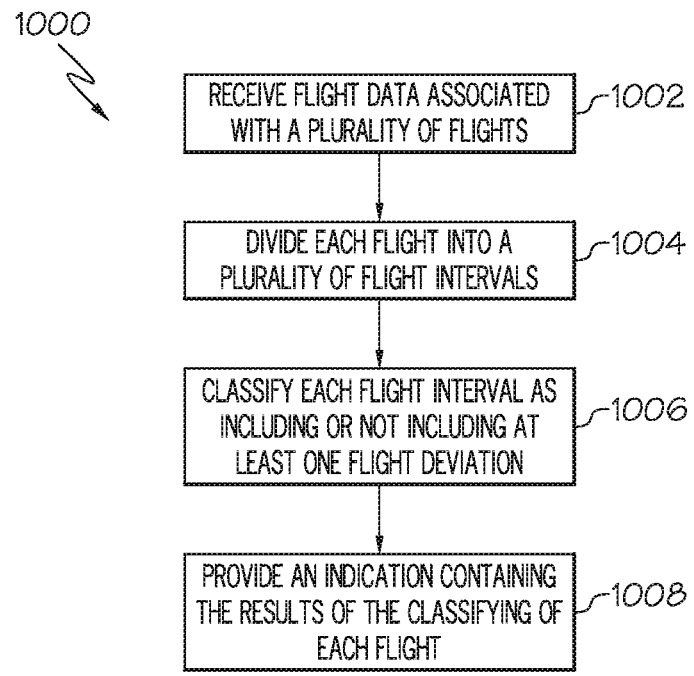
FIG. 10 depicts a flow diagram of an illustrative method of providing an indication identifying each flight of a plurality of flights as either including or not including at least one flight path deviation, according to one or more embodiments described herein.

Referring now to FIG. 10, a method 1000 of providing an indication identifying flights in a plurality of flights as including or not including at least one flight path deviation is shown, according to an example embodiment. In embodiments, the method 1000 may be performed via the flight analysis system 304 described with respect to FIGS. 3-4 herein. For example, in embodiments, the image generation module 410, the flight analysis module 412, and the flight characterization module 414 may include instructions that are executed via the processor 400 to perform the method 1000.

Referring to FIGS. 3-4 and 10, in a step 1002, flight data associated with the plurality of flights is received by the flight analysis system 304. As described herein, in embodiments, the flight information system 302 may periodically transmit flight data to the flight analysis system 304 over the network 308. The flight data may be similar to that described above with respect to FIG. 6 and include pluralities of sets of coordinates describing actual and planned locations of aircraft at various points in time in the flights described in the received flight data. In embodiments, the flight data is retrieved from the database 416 of the flight analysis system 304.

In a step 1004, each flight described in the received flight data is divided into a plurality of time or flight intervals via the flight analysis module 412. As described herein, the flight data associated with each flight may be divided into the flight intervals in a number of ways depending on the implementation. For example, in embodiments, the image generation module 410 generates a digital flight path image depicting each flight in a two dimensional space, and the flight analysis module 412 applies a sliding time window to the digital flight path image to generate a plurality of sub-flight images depicting various segments of the flight associated with subsets of the plurality of coordinates associated with the flight. In embodiments, the flight analysis module 412 divides the flight data into a plurality of subsets based on time coordinates included in the plurality of coordinates associated with each flight. In embodiments, the length of the intervals into which the flight data is divided into is based on particular flight path deviations desired to be identified in the flight data. For example, to identify a holding pattern, a smaller flight interval may be used than if one were to identify a detour because a holding pattern may be included in a more compressed timeframe than a relatively large detour.

In a step 1006, each flight interval is classified as including or not including at least one flight path deviation by successively applying a plurality of filtering layers of a CNN algorithm implemented by the flight analysis module to each flight interval. As described with respect to FIG. 7 herein, application of the CNN algorithm to each flight interval may generate a plurality of probabilities, with each of the probabilities indicating a likelihood that the flight interval includes a particular flight path deviation (e.g., a holding pattern, a detour, and a shortcut). If at least one of the probabilities is above a threshold, the flight interval may be classified as including the flight path deviation associated with that probability. If multiple probabilities are above the threshold, the flight interval may be classified as having multiple flight path deviations (e.g., both a holding pattern and a detour).

In embodiments, if a particular flight interval is classified as including a particular flight path deviation, the flight analysis module 412 may estimate a length of the flight path deviation. For example, in embodiments, after each flight interval of a particular flight is classified, the flight analysis module 412 may determine a number of flight intervals in a grouping of flight intervals surrounding that flight interval (or adjacent to that flight interval) that were also classified as including the same flight path deviation. The number of flight intervals in the grouping of flight intervals so classified may represent a duration of the flight path deviation based on the time intervals represented by each flight interval. For example, in embodiments where the flight generation module generates each sub-flight image by advancing the sliding time window a fixed amount (e.g., 10 seconds), the estimated duration of the flight path deviation may include the number of flight intervals classified as including the flight path deviation multiplied by the fixed amount. In embodiments, if each flight interval represents a non-overlapping portion of the flight, the estimated duration of the flight path deviation may be the number of flight intervals multiplied by the amount of time in the flight that each flight interval represents (e.g., 10 second, 1 minute, 5 minutes, etc.).

In a step 1008, the flight analysis system 304 provides an indication identifying each flight in the plurality of flights represented by the flight data as either including or not including at least one flight path deviation based on the results of the classification. As described herein, the flight characterization module 414 may generate reports identifying whether each flight described in the flight data includes or does not include a flight path deviation. In embodiments, the indication identifies which flight path deviations that the classification identified to be included in a particular flight as well as the durations of any such flight path deviations. Additionally, the indication may group the flight together based on route and indicate portions of the grouped flights that included at least one flight path deviation or a particular flight path deviation. The indication may also include statistics regarding the flight path deviations (e.g., average length of holding patterns and detours).

Figure 11:
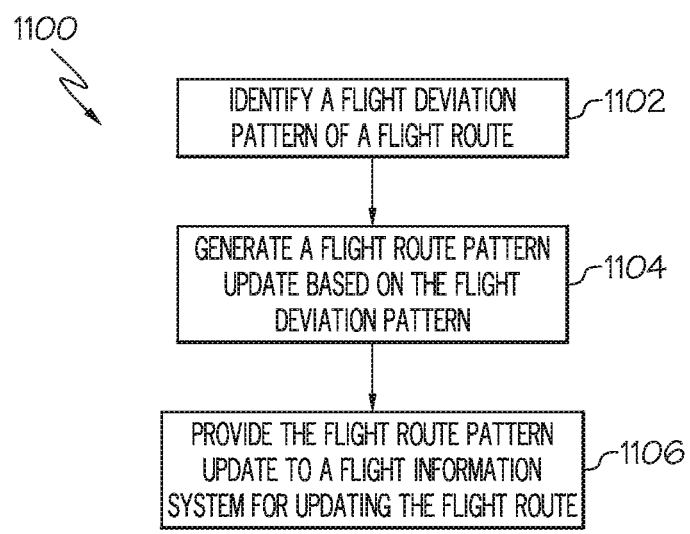
FIG. 11 depicts a flow diagram of an illustrative method of updating a flight route pattern based on a flight path deviation pattern of a flight route, according to one or more embodiments described herein.

Referring now to FIG. 11, a method 1100 of updating a flight route pattern based on a flight path deviation pattern is shown, according to an example embodiment. In embodiments, the method 1000 may be performed via the flight optimization system 306 described with respect to FIGS. 3 and 5 herein. In a step 1102 a flight path deviation pattern is identified. As described herein, the flight optimization system 306 may receive a report from the flight analysis system 304 indicating the results of the classification of a plurality of flights via the flight analysis module 412. The flight optimization system 306, via, for example, the flight deviation analysis module 510, may analyse the report to identify the flight path deviation pattern. In embodiments, the flight path deviation pattern may include identifying a route where a particular percentage of flights include at least one flight path deviation. In embodiments, the flight path deviation pattern may include identifying that an average duration of a particular flight path deviation (e.g., a holding pattern) associated with a particular route is above a predetermined threshold. In embodiments, the flight path deviation pattern may comprise a correlation between flight path deviations in the flight data and additional flight data (e.g., weather conditions, air traffic patterns, certain times, or the like).

In a step 1104, the flight optimization system 306 updates a flight route pattern based on the flight path deviation pattern. For example, if the flight path deviation pattern identifies flights associated with a particular departure point or destination as frequently including a detour, the flight optimization system 306 (e.g., via the flight optimization module 512) may generate an updated planned flight route that has length that is less than the planned flight routes commonly including the detours, thus saving aircraft operators fuel costs and improving efficiency of operations. Other updates to a flight route pattern, such as adjusting times for particular routes may also be generated. The flight optimization module 512 may cause the flight optimization system 306 to recommend a plurality of different updates to a flight route pattern depending on the implementation.

In a step 1106, the flight optimization system 306 may provide the flight route pattern updates generated via the step 1104 to an additional computing system for updating the flight route. For example, in embodiments, the additional computing system may include the flight information system 302 described with respect to FIG. 3. The flight information system 302 may implement the flight route pattern updates by updating a plurality of future planned flight routes to lower the probabilities of such future flights having to implement unexpected flight path deviations to improve efficiency and timeliness. In embodiments, the flight route pattern updates may be provided (e.g., from the flight optimization system 306, from the flight information system 302, etc.) to a computing system on-board an aircraft (e.g., an aircraft controller unit) such that a planned flight route may be updated during the flight to minimize a flight path deviation probability during a flight. In embodiments, the flight route pattern updates may be provided (e.g., from the flight optimization system 306, from the flight information system 302, etc.) to a computing system associated with an air traffic controller (e.g., associated with an airport) to update a plurality of flight routes associated with a plurality of different aircraft operators to increase flight efficiencies across a broad array of flights.

In view of the foregoing description, it should be understood that identifying flight path deviations in flights by applying a CNN algorithm to a plurality of different flight intervals and using the identified flight path deviations for flight route pattern detection provides several benefits over existing static rule-based approaches. Using the systems and methods herein, a user may identify any number of flight path deviations contained in flight data by inputting a training data set into the CNN algorithm including a classification component containing a set of flight path deviations desired to be identified. Such an approach generates accurate flight classification results (e.g., at least 90%) in reduced computational time (e.g., less than 1 second per flight) over existing methods. The accurate and customizable results provided by the systems and methods herein facilitate detection of flight path deviation patterns among a plurality of flights and modification of flight route patterns based on such flight path deviation patterns, potentially enabling aircraft operators to save resources.

Further aspects of the invention are provided by the subject matter of the following clauses:

1. A method of providing an indication identifying a flight as including or not including a flight path deviation, the method comprising: receiving, by a computing system, flight data associated with a flight, the flight data comprising a plurality of coordinates indicating a location of an aircraft at a plurality of times during the flight; classifying, by a flight analysis module of the computing system, a plurality of time intervals of the flight by applying a convolutional neural network algorithm to subsets of the plurality coordinates corresponding to each time interval of the plurality of time intervals to determine that the time interval includes or does not include at least one flight path deviation; identifying, by the flight analysis module, the flight as including at least one flight path deviation if at least one of the time intervals is classified as including the at least one flight path deviation; and providing, by the computing system, an indication identifying the flight as including at least one flight path deviation to a second computing system in response to identifying the flight as including at least one flight path deviation.

2. The method according to any preceding clause, further comprising generating a digital flight path image of the flight data, the digital flight path image containing a flight path of the plurality of coordinates.

3. The method according to any preceding clause, further comprising dividing the flight path into a plurality of flight path segments representing portions of the flight path lying within a time window, wherein the subsets of the plurality of coordinates corresponding to each time interval correspond to the flight path segments.

4. The method according to any preceding clause, wherein the classifying of the plurality of time intervals of the flight includes determining that a portion of the plurality of time intervals include at least one flight path deviation that comprises a holding pattern.

5. The method according to any preceding clause, further comprising, responsive to the determining that the portion of the plurality of time intervals include the holding pattern, determining, by the flight analysis module, a duration of the holding pattern by identifying a number of the time intervals that are classified to include the holding pattern.

6. The method according to any preceding clause, wherein the plurality of coordinates includes planned flight coordinates indicating planned locations of the aircraft at the plurality of times during the flight, wherein the planned locations represent a planned flight path also contained in the digital flight path image.

7. The method according to any preceding clause, wherein the classifying of each of the plurality of time intervals determines that the flight path interval includes or does not include at least one of two flight path deviations comprising the holding pattern and a detour where the flight path deviates from the planned flight path.

8. The method according to any preceding clause, further comprising: receiving, by the computing system, flight data associated with a plurality of additional flights, the flight data comprising a plurality of sets of coordinates indicating locations of aircraft during the additional flights; classifying, by the flight analysis module, a plurality of time intervals of each of the additional flights by successively applying the plurality of filters of the convolutional neural network algorithm to subsets of the plurality of sets of coordinates corresponding to each time interval of the plurality of time intervals of each of the additional flights, to determine that the time interval includes or does not include the at least one flight path deviation; and identifying, by the flight analysis module, each flight of the plurality of additional flights as including the at least one flight path deviation if at least one of the time intervals in the additional flight is classified as including the at least one path deviation, wherein the indication identifies the each of the additional flights as including or not including the at least one flight path deviation.

9. The method according to any preceding clause, further comprising transmitting, by the computing system, an output to the second computing system, the output indicating percentages of the flights identified as including at least one flight path deviation.

10. The method according to any preceding clause, wherein the percentages of the flights identified as including at least one flight path deviation are broken up into portions of the flights associated with a particular route between a departure point and a destination.

11. The method according to any preceding clause, wherein each coordinate of the plurality of coordinates comprises a first coordinate indicating a latitude of the aircraft, a second coordinate indicating a latitude of the aircraft, and a third coordinate indicating a timestamp in which the aircraft was at the latitude and the longitude during the flight, wherein boundaries of the pluralities of time intervals are determined based on the timestamps within the plurality of coordinates.

12. A method of providing an indication identifying a flight as including or not including a flight path deviation, the method comprising: receiving, by a computing system, flight data associated with a flight, the flight data comprising a plurality of coordinates indicating locations of an aircraft during the flight; dividing, by a flight analysis module of the computing system, the flight data into a plurality of subsets, each of the subsets associated with a flight interval of the flight, wherein flight interval has a first end indicating a first location of the aircraft at a first time within the flight interval and a second end indicating a second location of the aircraft at a second time within the flight interval; characterizing, by the flight analysis module, each of the flight intervals by successively applying a plurality of filters of a convolutional neural network algorithm to each of the plurality of subsets to determine that the flight interval includes or does not include at least one flight path deviation; providing, by the computing system, an indication that the flight either includes or does not include the at least one flight path deviation based the characterization of each flight interval to a second computing system.

13. The method according to any preceding clause, wherein the characterizing each of the flight intervals includes determining that the flight interval includes or does not include at least one flight path deviation comprising a holding pattern.

14. The method according to any preceding clause, further comprising, responsive to determining that some of the flight intervals include the holding pattern, calculating, by the flight analysis module, a duration of the holding pattern by determining a number of the flight intervals that include the holding pattern.

15. The method according to any preceding clause, wherein the characterizing each of the flight intervals includes determining that the flight interval includes or does not include at least one flight path deviation comprising a detour.

16. The method according to any preceding clause, wherein the characterizing each of the flight intervals includes determining that the flight interval includes or does not include at least one of two flight path deviations comprising a detour or a holding pattern.

17. The method according to any preceding clause, further comprising, prior to dividing the flight data into the plurality of subsets, generating, by an image generation module of the computing system, a digital flight path image of the flight data, the digital flight path image containing a flight path representing the plurality of coordinates, wherein dividing the flight data into the plurality of subsets comprises dividing the flight path into a plurality of flight path segments based on a fixed time window, wherein each one of the plurality of flight path segments corresponds to one of the flight intervals of the flight.

18. A system for providing an indication identifying a flight as including or not including a flight path deviation, the system comprising: one or more processors; and one or more non-transitory memory modules communicatively coupled to the one or more processors and storing machine-readable instructions that, when executed, cause the one or more processors to: receive flight data associated with a flight, the flight data comprising a plurality of coordinates indicating a location of an aircraft at a plurality of times during the flight; classify a plurality of time intervals of the flight by successively applying a plurality of filters of a convolutional neural network algorithm to subsets of the plurality coordinates corresponding to each time interval of the plurality of time intervals to determine that the time interval includes or does not include at least one flight path deviation; identify the flight as including at least one flight path deviation if at least one of the time intervals is classified as including the at least one flight path deviation; and provide an indication identifying the flight as including or not including at least one flight path deviation to a second computing system.

19. The system according to any preceding clause, wherein the non-transitory memory modules further cause the one or more processors to generate a digital flight path image of the flight data, the digital flight path image containing a flight path of the plurality of coordinates.

20. The system according to any preceding clause, wherein the non-transitory memory modules further cause the one or more processors to divide the flight path into a plurality of flight path segments representing portions of the flight path lying within a time window, wherein the subsets of the plurality of coordinates corresponding to each time interval correspond to the flight path segments.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of providing an indication identifying a flight as including or not including a flight path deviation, the method comprising:
receiving, by a computing system, flight data associated with a flight, the flight data comprising a plurality of coordinates indicating a location of an aircraft at a plurality of times during the flight;
classifying, by a flight analysis module of the computing system, a plurality of time intervals of the flight by applying a convolutional neural network algorithm to subsets of the plurality coordinates corresponding to each time interval of the plurality of time intervals to determine that the time interval includes or does not include at least one flight path deviation;
identifying, by the flight analysis module, the flight as including at least one flight path deviation if at least one of the time intervals is classified as including the at least one flight path deviation;
providing, by the computing system, an indication identifying the flight as including at least one flight path deviation to a second computing system in response to identifying the flight as including at least one flight path deviation; and
transmitting, by the computing system, an output to the second computing system that indicates percentages of additional flights identified as including at least one flight path deviation.

2. The method of claim 1, further comprising generating a digital flight path image of the flight data, the digital flight path image containing a flight path of the plurality of coordinates.

3. The method of claim 2, further comprising dividing the flight path into a plurality of flight path segments representing portions of the flight path lying within a time window, wherein the subsets of the plurality of coordinates corresponding to each time interval correspond to the flight path segments.

4. The method of claim 3, wherein the classifying of the plurality of time intervals of the flight includes determining that a portion of the plurality of time intervals include at least one flight path deviation that comprises a holding pattern.

5. The method of claim 4, further comprising, responsive to the determining that the portion of the plurality of time intervals include the holding pattern, determining, by the flight analysis module, a duration of the holding pattern by identifying a number of the time intervals that are classified to include the holding pattern.

6. The method of claim 2, wherein the plurality of coordinates includes planned flight coordinates indicating planned locations of the aircraft at the plurality of times during the flight, wherein the planned locations represent a planned flight path also contained in the digital flight path image.

7. The method of claim 6, wherein the classifying of each of the plurality of time intervals determines that the flight path interval includes or does not include at least one of two flight path deviations comprising the holding pattern and a detour where the flight path deviates from the planned flight path.

8. The method of claim 1, further comprising:
receiving, by the computing system, flight data associated with a plurality of the additional flights, the flight data comprising a plurality of sets of coordinates indicating locations of aircraft during the additional flights;
classifying, by the flight analysis module, a plurality of time intervals of each of the additional flights by successively applying the plurality of filters of the convolutional neural network algorithm to subsets of the plurality of sets of coordinates corresponding to each time interval of the plurality of time intervals of each of the additional flights, to determine that the time interval includes or does not include the at least one flight path deviation; and
identifying, by the flight analysis module, each flight of the plurality of additional flights as including the at least one flight path deviation if at least one of the time intervals in the additional flight is classified as including the at least one path deviation, wherein the indication identifies the each of the additional flights as including or not including the at least one flight path deviation.

9. The method of claim 1, wherein the percentages of the additional flights identified as including at least one flight path deviation are divided into portions of the flights associated with a particular route between a departure point and a destination.

10. The method of claim 1, wherein each coordinate of the plurality of coordinates comprises a first coordinate indicating a latitude of the aircraft, a second coordinate indicating a latitude of the aircraft, and a third coordinate indicating a timestamp in which the aircraft was at the latitude and the longitude during the flight, wherein boundaries of the pluralities of time intervals are determined based on the timestamps within the plurality of coordinates.

11. A method of providing an indication identifying a flight as including or not including a flight path deviation, the method comprising:
receiving, by a computing system, flight data associated with a flight, the flight data comprising a plurality of coordinates indicating locations of an aircraft during the flight;
dividing, by a flight analysis module of the computing system, the flight data into a plurality of subsets, each of the subsets associated with a flight interval of the flight, wherein flight interval has a first end indicating a first location of the aircraft at a first time within the flight interval and a second end indicating a second location of the aircraft at a second time within the flight interval;
characterizing, by the flight analysis module, each of the flight intervals by successively applying a plurality of filters of a convolutional neural network algorithm to each of the plurality of subsets to determine that the flight interval includes or does not include at least one flight path deviation;
providing, by the computing system, an indication that the flight either includes or does not include the at least one flight path deviation based the characterization of each flight interval to a second computing system; and transmitting, by the computing system, an output to the second computing system that indicates percentages of additional flights identified as including at least one flight path deviation.

12. The method of 11, wherein the characterizing each of the flight intervals includes determining that the flight interval includes or does not include at least one flight path deviation comprising a holding pattern.

13. The method of 12, further comprising, responsive to determining that some of the flight intervals include the holding pattern, calculating, by the flight analysis module, a duration of the holding pattern by determining a number of the flight intervals that include the holding pattern.

14. The method of 11, wherein the characterizing each of the flight intervals includes determining that the flight interval includes or does not include at least one flight path deviation comprising a detour.

15. The method of 14, wherein the characterizing each of the flight intervals includes determining that the flight interval includes or does not include at least one of two flight path deviations comprising a detour or a holding pattern.

16. The method of claim 11, further comprising, prior to dividing the flight data into the plurality of subsets, generating, by an image generation module of the computing system, a digital flight path image of the flight data, the digital flight path image containing a flight path representing the plurality of coordinates, wherein dividing the flight data into the plurality of subsets comprises dividing the flight path into a plurality of flight path segments based on a fixed time window, wherein each one of the plurality of flight path segments corresponds to one of the flight intervals of the flight.

17. A system for providing an indication identifying a flight as including or not including a flight path deviation, the system comprising:
one or more processors; and
one or more non-transitory memory modules communicatively coupled to the one or more processors and storing machine-readable instructions that, when executed, cause the one or more processors to:
receive flight data associated with a flight, the flight data comprising a plurality of coordinates indicating a location of an aircraft at a plurality of times during the flight;
classify a plurality of time intervals of the flight by successively applying a plurality of filters of a convolutional neural network algorithm to subsets of the plurality coordinates corresponding to each time interval of the plurality of time intervals to determine that the time interval includes or does not include at least one flight path deviation;
identify the flight as including at least one flight path deviation if at least one of the time intervals is classified as including the at least one flight path deviation;
provide an indication identifying the flight as including or not including at least one flight path deviation to a second computing system; and
transmit an output to the second computing system that indicates percentages of additional flights identified as including at least one flight path deviation.

18. The system of 16, wherein the non-transitory memory modules further cause the one or more processors to generate a digital flight path image of the flight data, the digital flight path image containing a flight path of the plurality of coordinates.

19. The system of claim 18, wherein the non-transitory memory modules further cause the one or more processors to divide the flight path into a plurality of flight path segments representing portions of the flight path lying within a time window, wherein the subsets of the plurality of coordinates corresponding to each time interval correspond to the flight path segments.

* * * * *

UNITED STATES PATENT AND TRADEMARK OFFICE
CERTIFICATE OF CORRECTION

PATENT NO. : 11,727,816 B2
APPLICATION NO. : 17/012421
DATED : August 15, 2023
INVENTOR(S) : Xiang Gu, Xiaojie Wu and Shangyun Lu It is certified that error appears in the above-identified patent and that said Letters Patent is hereby corrected as shown below:

On the Title Page

Item (72), inventor 3, name, delete "Shangyun Lv" and insert --Shangyun Lu--, therefor.

Signed and Sealed this
Fifth Day of December, 2023

Katherine Kelly Vidal
*Director of the United States Patent and Trademark Office*